United States Patent [19]

Mächler et al.

[11] Patent Number: 4,781,455

[45] Date of Patent: Nov. 1, 1988

[54] METHOD FOR MEASURING OPTICAL STRAIN AND APPARATUS THEREFOR

[75] Inventors: Meinrad Mächler, Ellwangen; Harry Schlemmer; Ursula Rager, both of Aalen, all of Fed. Rep. of Germany

[73] Assignee: Carl-Zeiss-Stiftung, Heidenheim, Fed. Rep. of Germany

[21] Appl. No.: 861,160

[22] Filed: May 8, 1986

[30] Foreign Application Priority Data

May 8, 1985 [DE] Fed. Rep. of Germany ....... 3516538

[51] Int. Cl.⁴ .............................................. G01B 11/18
[52] U.S. Cl. ......................................... 356/34; 356/32
[58] Field of Search ................... 356/32, 33, 34, 35.5, 356/357, 381; 250/227; 73/800

[56] References Cited

U.S. PATENT DOCUMENTS

| | | | |
|---|---|---|---|
| 3,082,664 | 3/1963 | Acloque | 356/35 |
| 3,623,813 | 11/1971 | Hacman | 356/357 |
| 3,824,017 | 7/1974 | Galyon | 356/357 |
| 4,493,995 | 1/1985 | Adolfsson et al. | 250/227 |
| 4,498,772 | 2/1985 | Jastrzebski et al. | 356/357 |

OTHER PUBLICATIONS

"Holographic Method Giving Stress Levels and Visualization of Defects in Thick Cylinders".

Primary Examiner—R. A. Rosenberger
Assistant Examiner—Crystal Cooper
Attorney, Agent, or Firm—Walter Ottesen

[57] ABSTRACT

A method and an apparatus for optical strain measurement are disclosed. Prior to the deformation or loading of the object to be tested, the latter is provided with a thin transparent film which adheres well to the object and has a thickness between 3 and 20 μm. After the deformation or during loading, the wavelength-dependent intensity course developed because of the interference of the portion of the beam of light reflected and superimposed at the boundary surfaces of the transparent film is measured and evaluated by a computer.

30 Claims, 2 Drawing Sheets

METHOD FOR MEASURING OPTICAL STRAIN AND APPARATUS THEREFOR

FIELD OF THE INVENTION

The invention relates to a method and an apparatus for optical strain measurement using a transparent film applied to the object to be tested; an optical beam is aimed at this film and its reflected component is examined.

BACKGROUND OF THE INVENTION

Optical strain or expansion measurements using optical aids have long been known in various forms. In this connection, reference can be made, for example, to "Spannungsoptik" by H. Wolf, second edition, Berlin 1976 and "ABC der Optik", Hanau 1960. Investigations of this kind were predominantly carried out in models made of suitable optically transparent materials. The two different effects listed below were exploited and only the first-mentioned effect has proved to be of major significance.

1. Depending on the magnitude of the mechanical strains at the various points of the model, the optical path lengths are varied in different ways. The path differences when radiation is transmitted through the model can be made visible in an interferometric or polarization-optical apparatus. Results of suitable accuracy are attainable only with perfectly plane models.

2. Many transparent materials which are normally isotropic exhibit double refraction when elastically deformed; that is, the index of refraction varies differently in different directions. Since in most materials the differences are small, they are generally ignored in favor of the first method, above.

In contrast to these methods, which were performed with models, European Patent Application No. EP-PA 0 023 577 discloses an apparatus for direct optical measurement of the strains in glazes and transparent plastic parts. Here the indices of refraction of the glaze are measured by the method using the boundary angle of the total reflection, and the difference in the index of refraction resulting from the double refraction caused by strain is ascertained by measurements made with differently polarized light. For a glaze of predetermined composition, this difference in the index of refraction is directly proportional to the mechanical strain in the glaze.

The disadvantage of this measuring method is that for each measurement, one measuring prism and one illumination prism must be placed on the glaze and put into optical contact. Moreover, the glaze in the interior of the film must have a suitable scattering capacity. Furthermore, the method is inherently suitable only for objects that are transparent and are made of a material that is suitable for such measurements. In many fields of technology, however, it is important to measure strains on the surface of objects that are not transparent and that cannot be replicated in the form of models, or can be so replicated only at great expense. Examples include sheet-metal body panels in the automobile industry and fuselage and wing assembly structures in the aircraft industry.

From a publication by P. Bluml et al entitled "Optische Verfahren in der experimentellen Spannungsanalyse", VDI-Berichte No. 439, (1982), an optical surface-film strain measuring method is known, in which a transparent film having a thickness of 1.2 to 3.2 mm is glued to the surface of the object to be tested. After deformation or during the application of load to the object, this film is observed or photographed with a reflection polariscope and the evaluation is made pursuant to the first method listed above. The disadvantage of this method is primarily that the peripheral zones of the film are unsuitable for evaluation purposes, because strain gradients in the direction of the film thickness falsify the results, and the strain behavior of thin objects is affected by the relatively thick layer.

SUMMARY OF THE INVENTION

It is an object of the invention to provide a method with which an optical strain measurement can be performed even for items that are not transparent to light, without having to prepare a model, made of transparent material, of the object to be tested and without the method itself affecting the measurement results as is the case with the known surface-film method. It is a further object to provide a suitable measurement apparatus for performing such a method.

Using a transparent film applied to the object and measuring the reflection of the film, this object of the invention is attained by measuring and evaluating the wavelength-dependent course of intensity produced by interference of the component beam of light that is reflected and superposed on the boundary surfaces of the transparent film., An apparatus is provided for performing the method, in which the beam of a tunable laser, for instance, is aimed at the transparent film, and a receiver measures the intensity arising from interference of the portion of the beam of light that is reflected and superposed at the boundary surfaces. Instead of the tunable laser, a continuous spectrum emitter having a monochromator can be used, or a filter which is continuously adjustable for the transmitting wavelength.

An apparatus for performing the method is also provided in which the beam of a continuous spectrum emitter is aimed at the transparent film, and a spectrometer measures the wavelength-dependent course of the intensity arising from interference of the portion of the beam of light that is reflected and superposed on the boundary surfaces.

In a particularly advantageous embodiment, the wavelength-dependent course of this intensity is measured using a diode-array spectrometer.

A wavelength-dependent course of intensity due to interference and which can be readily evaluated arises when the thickness of the transparent film is less than 50 $\mu$m. In such a thin film, strain gradients cannot form in the direction of the film thickness. Furthermore, the strain ratios per se of thin objects, such as sheet metal, are virtually unaffected by such a thin film because the lower limit for a wavelength-dependent intensity course due to interference which can still be evaluated is on the order of approximately one $\mu$m.

An additional advantage of the invention is that a measurement is possible even when the surface areas of the sample objects are less than one mm$^2$.

BRIEF DESCRIPTION OF THE DRAWING

The invention will now be described with reference to the drawing wherein.

DESCRIPTION OF THE PREFERRED EMBODIMENTS OF THE INVENTION

Figure 1:
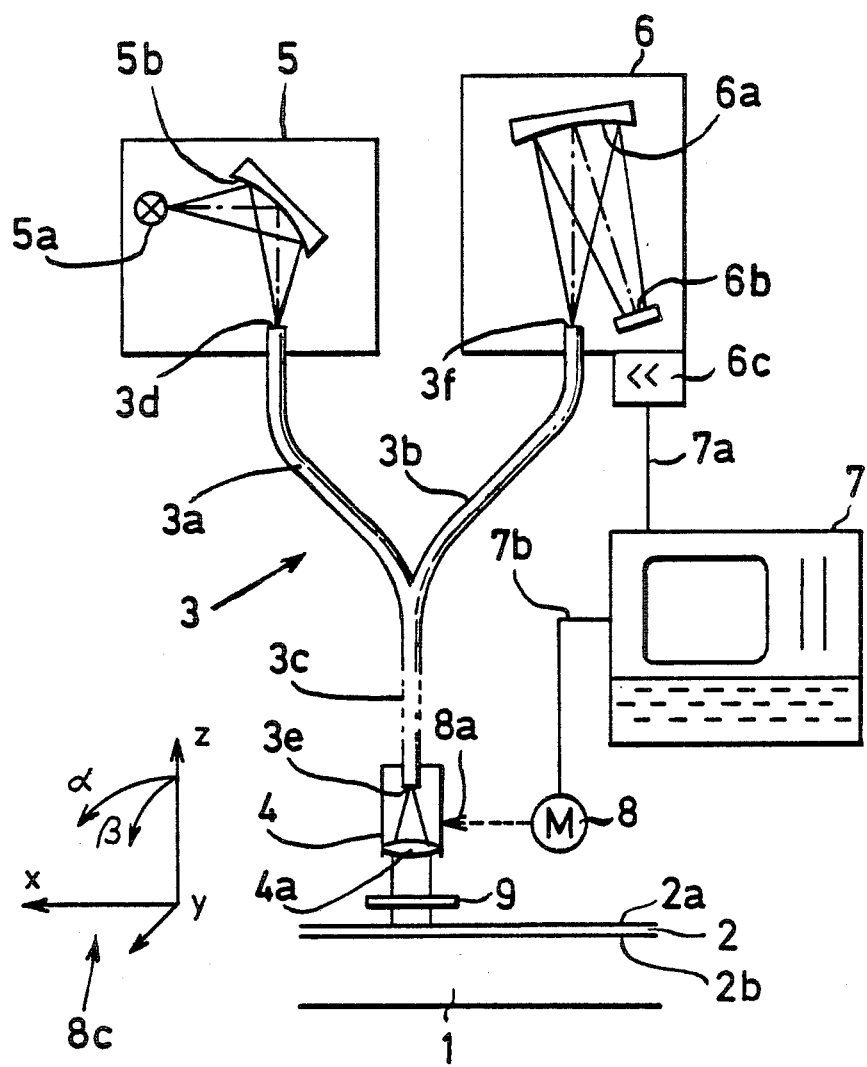
FIG. 1 is a schematic of a first embodiment of the apparatus according to the invention wherein a continuous radiation source is provided for supplying and directing a bundle of optical rays onto the transparent film formed on the object; and, FIG. 2 is a schematic of a second embodiment of the apparatus according to the invention wherein optical ray source means is provided for supplying and directing a bundle of optical rays having a continuously adjustable wavelength onto the transparent film formed on the object.

In the drawing, the object 1 is shown for which the mechanical strains produced on its surface by deformation or loading are to be detected by making measurements. For this purpose, prior to the deformation or loading, a thin transparent film 2 is applied to the surface of the object 1 to which it adheres well. An example of a suitable material for this film is the metal protective lacquer Z 186 made by the Manciewicz Company, Hamburg, Federal Republic of Germany. Such lacquers can be applied by spraying, for example, or by dipping the object into a bath and allowing the lacquer to drip off.

Although the thickness of the film 2 is not a direct factor in the measurement, it is useful for good performance of the measurement method described below for the film thickness to be as nearly uniform as possible and to be in the range between 2 and 20 $\mu$m. Such a thin film 2 does not affect the behavior of the object 1 during the deformation or stress, even if the object is thin sheet metal, for example. What is important is that the film 2 adheres well to the object 1, so that the strains on the surface of the object 1 are transmitted to the transparent film 2.

To measure the strains in the film 2, the wavelength-dependent course of intensity is measured which arises from interference of the portion of the beam of light reflected at the boundary surfaces 2a and 2b of the transparent film 2. For this purpose, the beam of the continuous spectrum emitter 5a, for instance a high-pressure xenon lamp, is aimed at the film. For the greatest possible ease of handling of the measuring apparatus, the beam is aimed at the film 2 and the reflected light is deflected from the film 2 via a Y-shaped optical fiber conductor 3. The branch 3a of this optical fiber conductor is connected to the illumination device 5, in which the radiating face of the continuous spectrum emitter 5a is projected via an elliptical concave mirror 5b onto the entry face 3d of the optical fiber conductor 3.

It is suitable for the branches 3a and 3b of the Y-shaped conductor to comprise a plurality of conductor fibers which are arranged beside one another in the trunk 3c. The conductor fibers of the branch 3b receive the light reflected from the boundary surfaces 2a and 2b of the transparent layer 2 and conduct it to the spectrometer 6. The common end 3e of all the conductor fibers is mounted in a measuring head 4, which contains a convex lens 4a disposed spaced from the end 3e of the optical fibers. This spacing is a distance of one to two times the focal length of the lens 4a. The most favorable spacing between the measuring head 4 and the transparent film 2 can easily be determined by experimentation, as will be described later herein.

At the end 3e of the trunk of the Y-shaped conductor, the optical fibers belonging to the two branches 3a and 3b can be arranged either regularly or statistically with respect to one another. However, it is also possible for the optical fibers belonging to the branch 3a to be arranged in an inner circle, surrounded by a circular ring comprising the optical fibers belonging to the branch 3b.

At the end 3f of the branch 3b, the optical fibers are suitably arranged to define a slit, so that their end faces replace the entry slit usually associated with spectrometers. The spectrometer 6 therefore comprises only the concave grating 6a and the diode array 6b, which is connected to the electronic unit 6c. The electronic unit 6c preprocesses the signals of the diode array 6b which are transmitted to the computer 7 via the line 7a. The evaluation performed by the computer 7 will be described later herein.

It is advantageous for the spectrometer 6 to be dimensioned such that it has an aperture ratio that accommodates the aperture of the branch 3b of the optical fiber conductor 3 without cropping. This can be done with a holographically produced concave grating as shown in published German patent application DE-OS No. 32 15 879.

The ends of the Y-shaped conductor 3 may be configured such that they can be joined to the illumination device 5 and the spectrometer 6 by easily manipulated plug connections, which also makes it possible for the conductor fibers to have accurately defined positions. Examples of such connecting elements are also described in published German patent application DE-OS No. 32 15 879.

Often, the strains arising on the object 1 are of interest not merely at a few locations but over the entire surface of the object. In such cases, it is advantageous for the measuring head 4 to be positioned automatically so that a meandering scanning pattern can be traced, for example. For this purpose, the measuring head 4 can be incorporated into a known mechanical scanner which is indicated schematically in the drawing by the motor 8 and the connection 8a with the measuring head. It is useful to provide for movement of the measuring head not only in the two directions marked x and y but also, as shown at 8c in the drawing, in the z direction, and that it be tiltable through the angles $\alpha$ and $\beta$ that are at right angles to one another, so that objects that are not flat can be measured as well. All the movements and tilting are controlled via the connection 7b by the computer 7 in accordance with appropriate programs. At least the movement in the z direction and the tilting about the angles $\alpha$ and $\beta$ are effected in the basis of evaluated measurements as will be explained below.

Figure 2:
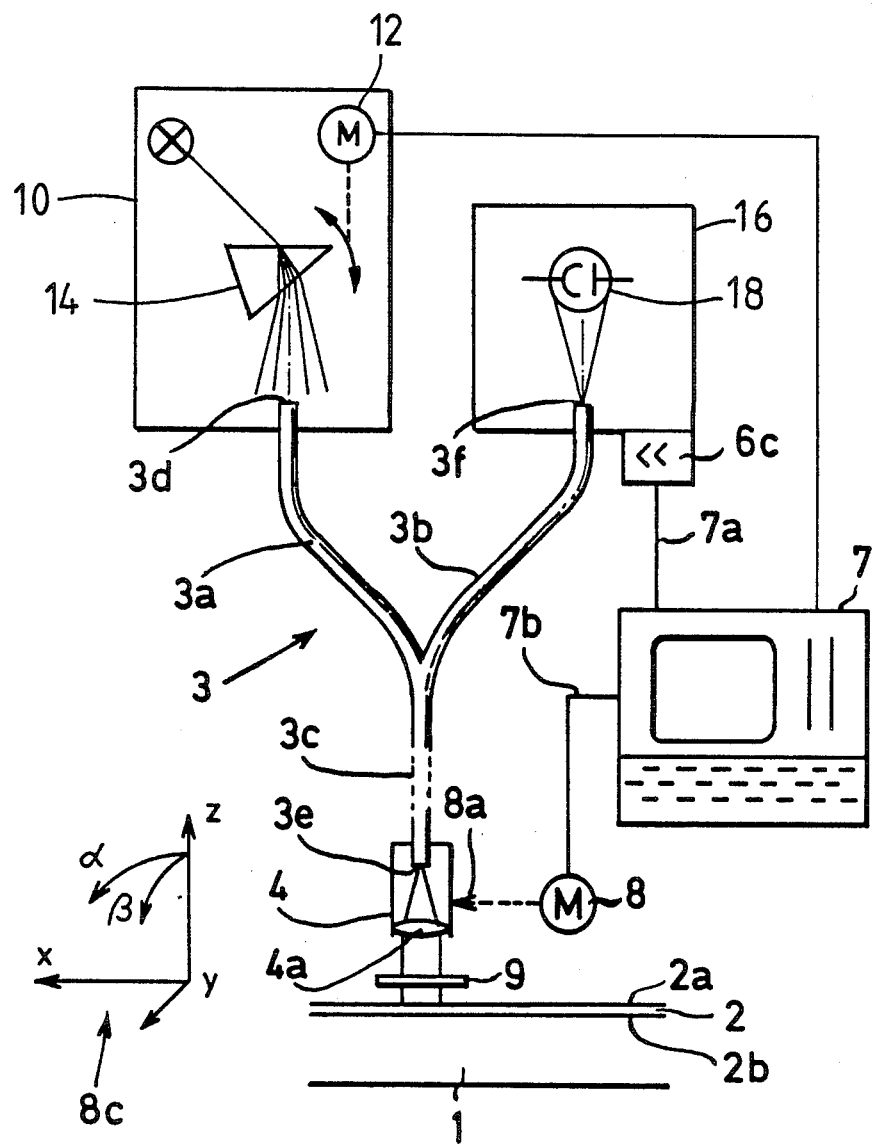

FIG. 2 is a schematic of a second embodiment according to the invention and includes an illumination device 10 connected to the branch 3a of the Y-shaped optical fiber conductor 3. The illumination device 10 includes a prism monochromator which passes wavelengths that are continuously adjustable by means of a motor 12. The motor 12 is operatively connected to the prism 14 of the prism monochromator as shown. The receiver 16 includes a photocell 18. If desired, a secondary electron multiplier can be used in lieu of the photocell 18. Also, any other suitable receiver could be used in lieu of the photocell 18.

The wavelength-dependent intensity course that is picked up by the spectrometer 6 can be evaluated in various ways; one such method, in which the indices of refraction are ascertained directly, is described in detail below.

After the transparent film 2 has been applied to the object 1, but prior to any loading stress or deformation, the exact film thickness, or its dependency on the coordinates of the surface, is first ascertained from the measured intensity course which is dependent upon wavelength. This film thickness or dependency is determined using the measuring apparatus shown in the drawing. For this purpose, the index of refraction, or the course of the index of refraction, as a function of the wavelength of the unstressed transparent film 2 must be known. For the substance used and under identical processing conditions, this can be determined by known methods, for instance with an Abbe refractometer. If n or n(λ) is known, the film thickness can be calculated from the maximums and minimums in the wavelength-dependent course of intensity in accordance with the following equation:

$$d = \frac{\lambda_a \lambda_e P}{2|n(\lambda_e) \lambda_a - n(\lambda_a) \lambda_e|}$$

In the equation, $\lambda_a$ and $\lambda_e$ are wavelengths for which, because of interference, maximums and minimums arise in the intensity course, and P is the number of periods between these extremes (P=1 for the interval from one maximum to the next). High accuracy is obtained if the number of periods is high. Accordingly, it is useful for measurement to be performed in a wavelength range in which the index of refraction varies either little or not at all. For the substance mentioned above, this range is from 600 to 1000 nm.

For varying the index of refraction as a function of the strains present in the transparent film, calibrated curves are first recorded for the substance used under identical processing conditions. For this purpose, strains are produced in a suitable object which can be calculated from the geometry, from data on the material and from the operative forces or, these strains can be measured by other methods such as strain gauges. Since double refraction then occurs in the transparent film 2, a polarizer 9 is mounted between this film and the measuring head 4. The polarizer 9 is rotated either manually or by a motor (not shown) that is controlled by the computer 7. In this calibration, the direction of the strain that has been produced is known, so that the polarizer 9 has to be rotated only in this direction. Next, a larger range of the wavelength-dependent intensity course is recorded, and from the latter, the index of refraction $n_\parallel$ is ascertained according to the following equation:

$$n_{ij} = \frac{\lambda_i \lambda_j P}{2d|\lambda_i - \lambda_j|}$$

In this equation, $n_{ij}$ is the mean index of refraction for the wavelength interval from $\lambda_i$ to $\lambda_j$. The symbols $\lambda_i$ and $\lambda_j$ are wavelengths at which a maximum or a minimum is present and P is again the number of periods between these extremes. For the above-mentioned substance, $n_\parallel$ is also virtually constant in the wavelength range from 600 to 1000 nm, so that a very accurate determination of $n_\parallel$ is possible.

By rotating the polarizer by 90°, $n_\perp$ and thus $\Delta n$ can be ascertained, although this has no practical significance in the method described here. The same procedure is used for various strains having known values so that a calibration curve for $n_\parallel$ as a function of the strain $\sigma$ is obtained. This calibration curve is virtually a straight line provided that overly great strains are not applied.

Measurements of unknown strains on the object to be tested are now performed in an entirely equivalent manner. Since in this case the direction of the strain is not known, the polarizer is rotated such that an arbitrary extreme value of the wavelength-dependent intensity course is shifted to a wavelength which is as low as possible. The oscillation direction of the polarizer will then be in the direction of the tensile strain. The rotation of the polarizer can be performed automatically via control by the computer 7. It is also possible to store the calibration curves in memory in the computer, so that all the calculations and evaluation operations are performed in the computer.

To ascertain the strains over the entire surface of an object that is not flat, the measuring head 4 must also be tilted about the angles α and β and moved in the z direction. The angles α and β are adjusted such that the area below the wavelength-dependent intensity course becomes as large as possible. The spacing of the measuring head 4 from the transparent film 2 is adjusted such that the difference between the maximums and minimums of the wavelength-dependent intensity course becomes as great as possible. These adjustments also are suitably performed by the computer.

In the evaluation method described, the double refraction that occurs in the transparent film when strains are present is a disrupting factor which necessitates the use of a polarizer. However, the double refraction that occurs can also be evaluated directly. If no polarizer is provided between the measuring head 4 and the transparent film 2, then when the transparent film is stretched the wavelength-dependent intensity course will exhibit not only maximums and minimums but a fluctuation as well (with a longer period than in the case of the extreme values), because of the double refraction. By means of a Fourier transformation of this wavelength-dependent intensity course in the computer 7, a frequency analysis can be performed in a known manner; the result is the difference in the indices of refraction Δn due to the double refraction. There is an unequivocal relationship between this Δn and the tensile strain σ, which can be ascertained by a calibration as explained above. The directions of the strains are determined in this case by ascertaining the gradient course between the values for Δn that are picked up in a raster-type scanning pattern.

It is understood that the foregoing description is that of the preferred embodiments of the invention and that various changes and modifications may be made thereto without departing from the spirit and scope of the invention as defined in the appended claims.

What is claimed is:

1. A method for optically measuring strain in transparent and opaque objects comprising the steps of:

placing a transparent film upon the object to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

directing a bundle of optical rays onto said film so as to cause a portion of said rays to be reflected therefrom and define a component beam whereby a wavelength-dependent intensity course develops because of the interference of said component beam which is superposed and reflected at said boundary layers of said transparent film; and, measuring and evaluating said intensity course.

2. The method of claim 1, said transparent film having a thickness in the range of 3 to 20 μm.

3. A method for optically measuring strain in transparent and opaque objects comprising the steps of:

placing a transparent film upon the object to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

said transparent film being made of a metal protecting lacquer, and said lacquer being applied to said object by spraying the same thereon;

directing a bundle of optical rays onto said film so as to cause a portion of said rays to be reflected therefrom and define a component beam whereby a wavelength-dependent intensity course develops because of the interference of said component beam which is superposed and reflected at said boundary layers of said transparent film; and, measuring and evaluating said intensity course.

4. A method for optically measuring strain in transparent and opaque objects comprising the steps of:

placing a transparent film upon the object to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

said transparent film being made of a metal protecting lacquer, and said lacquer being applied by dipping said object into the same and allowing excess lacquer to drip therefrom;

directing a bundle of optical rays onto said film so as to cause a portion of said rays to be reflected therefrom and define a component beam whereby a wavelength-dependent intensity course develops because of the interference of said component beam which is superposed and reflected at said boundary layers of said transparent film; and, measuring and evaluating said intensity course.

5. The method of claim 1, said transparent layer being a foil which is held on said object by adhesive.

6. The method of claim 1, said transparent layer being a foil which is melted onto said object.

7. An apparatus for optically measuring strain in transparent and opaque objects comprising:

a transparent film formed on said object so as to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

optical ray source means arranged so as to be adjacent said transparent film for supplying and directing a bundle of optical rays of continuously adjustable wavelength onto said transparent film so as to cause a portion of said rays to be reflected therefrom and define a component beam whereby an intensity develops because of the interference of said component beam which is superposed and reflected at said boundary layers of said film; and, measuring means for measuring said intensity to obtain a measurement of the strain present in said object.

8. The apparatus of claim 7, comprising:

a Y-shaped light conductor having a common trunk and two branches extending from said trunk, said optical ray source means being connected to one of said branches;

said measuring means including receiver means connected to said other one of said branches for measuring the rays of said component beam; and, measuring head means connected to said trunk for directing said bundle of optical rays onto said film in a predetermined manner.

9. The apparatus of claim 8, said receiver means comprising a diode-array spectrometer.

10. The apparatus of claim 8, comprising computer means connected to said receiver means for evaluating the measurements made in said measuring means.

11. The apparatus of claim 10, said measuring head means comprising a mechanical scanning arrangement operatively connected to said computer means so as to be controllable by the latter; and, said computer means being programmed for making a position-dependent measurement and display of the mechanical strain in said object.

12. The apparatus of claim 11, said mechanical scanning arrangement being adapted for movement in three spatial coordinates and for tilting about two mutually perpendicular angles.

13. The apparatus of claim 7, said transparent film having a thickness in the range of 3 to 20 μm.

14. An apparatus for optically measuring strain in transparent and opaque objects comprising:

a transparent film formed on said object so as to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

said transparent film being made of a metal protecting lacquer, and said lacquer being applied to said object by spraying the same thereon;

optical ray source means for supplying and directing a bundle of optical rays of continuously adjustable wavelength onto said transparent film so as to cause a portion of said rays to be reflected therefrom and define a component beam whereby an intensity develops because of the interference of said component beam which is superposed and reflected at said boundary layers of said film; and, measuring means for measuring said intensity.

15. An apparatus for optically measuring strain in transparent and opaque objects comprising:

a transparent film formed on said object so as to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

said transparent film being made of a metal protecting lacquer, and said lacquer being applied by dipping said object into the same and allowing excess lacquer to drip therefrom;

optical ray source means for supplying and directing a bundle of optical rays of continuously adjustable wavelength onto said transparent film so as to cause a portion of said rays to be reflected therefrom and define a component beam whereby an intensity develops because of the interference of said component beam which is superposed and reflected at said boundary layers of said film; and, measuring means for measuring said intensity.

16. The apparatus of claim 7, said transparent layer being a foil which is held on said object by adhesive.

17. The apparatus of claim 7, said transparent layer being a foil which is melted onto said object.

18. An apparatus for optically measuring strain in transparent and opaque objects comprising:

a transparent film formed on said object so as to define boundary layers, said film being selected so as to adhere well to said object to ensure that the strains on the surface of the latter are transmitted to said film; said film having a thickness selected so as to be less than a predetermined value below which the formation of strain gradients in said film in the direction of the film thickness are precluded;

continuous radiation source means arranged so as to be adjacent said transparent film for supplying and directing a bundle of optical rays onto said transparent film so as to cause a portion of said rays to be reflected therefrom and define a component beam whereby a wavelength-dependent intensity course develops because of the interference of said component beam which is superposed and reflected at said boundary layers of said film; and, measuring means for measuring said intensity course to obtain a measurement of the strain present in said object.

19. The apparatus of claim 18, comprising:

a Y-shaped light conductor having a common trunk and two branches extending from said trunk, said continuous radiation source means being connected to one of said branches;

said measuring means including receiver means connected to said other one of said branches for measuring the rays of said component beam; and, measuring head means connected to said trunk for directing said bundles of optical rays onto said fibers in a predetermined manner.

20. The apparatus of claim 19, said receiver means comprising a diode-array spectrometer.

21. The apparatus of claim 19, comprising computer means connected to said receiver means for evaluating the measurements made in said measuring means.

22. The apparatus of claim 21, said measuring head means comprising a mechanical scanning arrangement operatively connected to said computer means so as to be controllable by the latter; and, said computer means being programmed for making a position-dependent measurement and display of the mechanical strain in said object.

23. The apparatus of claim 22, said mechanical scanning arrangement being adapted for movement in three spatial coordinates and for tilting about two mutually perpendicular angles.

24. The apparatus of claim 18, said transparent film having a thickness in the range of 3 to 20 $\mu$m.

25. An apparatus for optically measuring strain in transparent and opaque objects comprising:

a transparent film formed on said object so as to define boundary layers, said film being selected so as to adhere well to said object to ensure that the strains on the surface of the latter are transmitted to said film; said film having a thickness selected so as to be less than a predetermined value below which the formation of strain gradients in said film in the direction of the film thickness are precluded;

said transparent film being made of a metal protecting lacquer, and said lacquer being applied to said object by spraying the same thereon;

continuous radiation source means for supplying and directing a bundle of optical rays onto said transparent film so as to cause a portion of said rays to be reflected therefrom and defined a component beam whereby a wavelength-dependent intensity course develops because of the interference of said component beam which is superposed and reflected at said boundary layers of said film; and, measuring means for measuring said intensity course.

26. An apparatus for optically measuring strain in transparent and opaque objects comprising:

a transparent film formed on said object so as to define boundary layers, said film being selected so as to adhere well to said object to ensure that the strains on the surface of the latter are transmitted to said film; said film having a thickness selected so as to be less than a predetermine value below which the formation of strain gradients in said film in the direction of the film thickness are precluded;

said transparent film being made of a metal protecting lacquer, and said lacquer being applied by dipping said object into the same and allowing excess lacquer to drip therefrom;

continuous radiation source means for supplying and directing a bundle of optical rays onto said transparent film so as to cause a portion of said rays to be reflected therefrom and define a component beam whereby a wavelength-dependent intensity course develops because of the interference of said component beam which is superposed and reflected at said boundary layers of said film; and, measuring means for measuring said intensity course.

27. The apparatus of claim 18, said transparent layer being a foil which is held onto said object by adhesive.

28. The apparatus of claim 18, said transparent layer being a foil which is melted onto said object.

29. The apparatus of claim 21, comprising adjusting means for continuously adjusting the wavelength of said optical rays; and, said computer means being connected to said adjusting means.

30. An apparatus for optically measuring strain in transparent and opaque objects comprising:

a transparent film formed on said object so as to define boundary layers and to adhere well to said object to ensure that the strains on the surface of the latter are transmitted to said film; said film having a thickness selected so as to be less than a predetermined value below which the formation of strain gradients in said film in the direction of the film thickness are precluded;

optical ray source means for supplying and directing a bundle of optical rays of continuously adjustable wavelength onto said transparent film so as to cause a portion of said rays to be reflected therefrom and define a component beam whereby an intensity develops because of the interference of said component beam which is superposed and reflected at said boundary layers of said film;

light conducting means for conducting said component beam away from said transparent film;

polarizer means rotatably mounted between said film and said light conducting means;

receiver means for receiving said component beam and measuring the wavelength-dependent course of the intensity arising from the interference of the light of said component beam; and, computer means connected to said receiver means for processing the output of the latter to compute the strain in said object.

* * * * *